March 22, 1932.  E. J. PANISH  1,850,807
METHOD AND MEANS FOR PREVENTING EXCESSIVE
VIBRATIONS OF SPEED RESPONSIVE DEVICES
Filed April 14, 1924
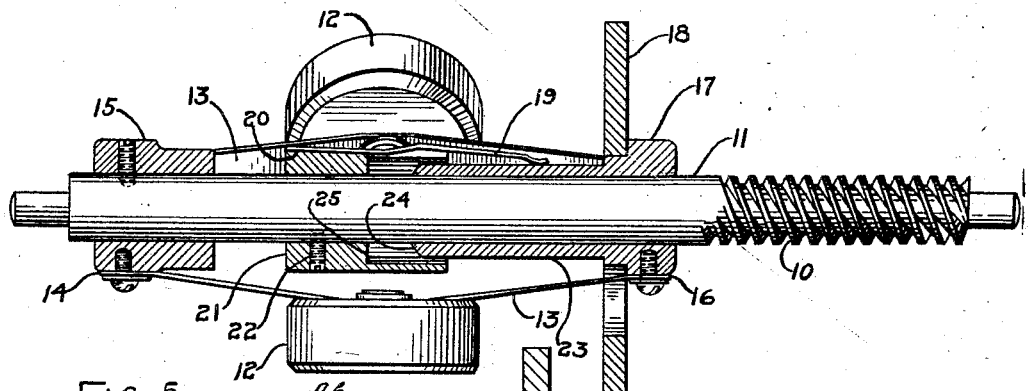
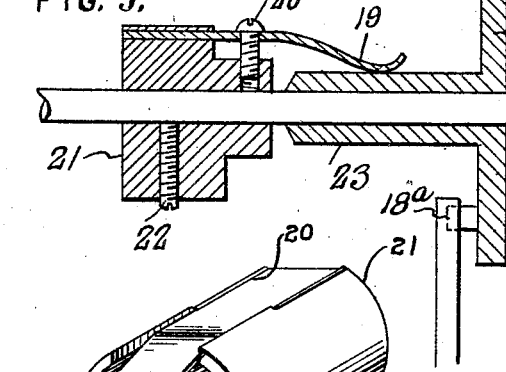
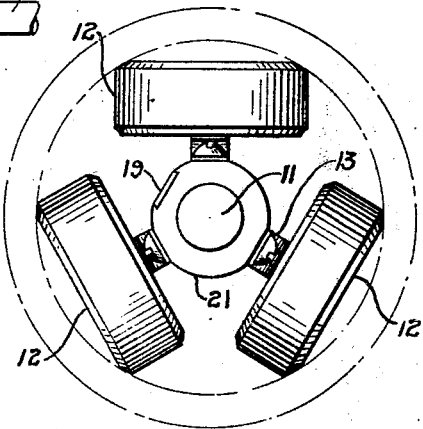
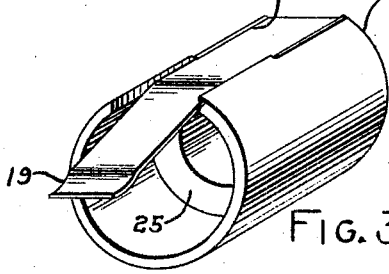
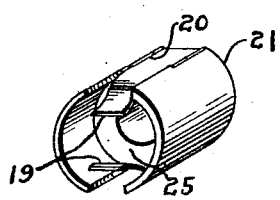
INVENTOR:
ERWIN J. PANISH
By *[signature]*
ATTORNEY Patented Mar. 22, 1932

1,850,807

UNITED STATES PATENT OFFICE

ERWIN J. PANISH, OF BRIDGEPORT, CONNECTICUT

METHOD AND MEANS FOR PREVENTING EXCESSIVE VIBRATIONS OF SPEED RESPONSIVE DEVICES

Application filed April 14, 1924. Serial No. 706,242.

This member relates to improvements in speed responsive devices and to improvements in methods of making and operating the same.

Figure 1 is a sectional view of a ball-type centrifugal speed-responsive device selected to illustrate this invention, capable of use as a governor and illustrating this invention as applied thereto.

Fig. 2 is an end view of the speed-responsive device shown in Fig. 1.

Fig. 3 is a perspective view of means provided by the present invention for absorbing the impressed vibrations of the parts, and the provision of which I have found to prevent "squaring" or "hunting" of the speed-responsive device.

Fig. 4 is a perspective view of one modification of the device shown in Fig. 3.

Fig. 5 is a longitudinal sectional view through the safety collar and sliding sleeve, showing the means provided by the present invention for absorbing excessive vibration.

The speed-responsive device shown in the accompanying drawings to illustrate one embodiment of my invention comprises a motion-receiving member 10 in the form of an endless screw. This member 10 may be formed integral with a shaft 11, or it may be a separate part secured to a shaft or other motion-transmitting means in any suitable way. In the form herein shown, the shaft 11 forms part of the speed-responsive device such as a governor to control the speed of mechanism, or a speedometer to indicate the speed of mechanism.

The mass which is moved in a rotary path by the movement imparted to the shaft 11, and which has developed in it, the centrifugal force produced by such rotation, comprises a plurality of weights 12. In the form shown, the weights 12 are carried by the device, for movement relative to other parts of it, by bow-springs 13, having their respective and corresponding ends 14, secured to a holder 15, preferably in the form of a collar. The bow-springs 13 have their other ends 16 secured to another and independent support 17 having its axis of rotation coincident with the axis of rotation of the shaft 11. As a matter of fact, it is usually preferable to have the collar 17 in sliding engagement with the shaft 11. The bow-springs 13 are formed to normally take the shape shown in Fig. 1.

One of the collars 15 or 17 is usually fixed to the shaft 11, (collar 15 being shown as so disposed), so that the rotary movement of the shaft may be transmitted to the weights 12. The other collar, in the illustrated form the collar 17, is connected to some annular member 18, such as a brake disk in case the device is employed as a governor; or other annular part, in case the device is used as a speed-indicator, etc.

The rotation of the parts, develops in the weights a centrifugal force which causes the weights to be thrown outwardly, deforming the bow-springs 13 and shortening the rectilinear distance between their respective ends. This pulls the collar 17 with its connected annular member 18 toward the collar 15 fastened to the shaft 11 and produces a relative movement longitudinally between the shaft and the annular member.

The speed of rotation, of course, determines the amount of centrifugal force developed; and this, in turn, determines the extent of relative movement between the shaft 11 and the annular member 18.

In the case of a governor having an annular member in the form of a brake disk, the latter cooperates with a brake-shoe 18ª for applying to the parts an action opposing rotation, which action keeps the parts rotating at a predetermined speed according to the setting of the brake-shoe. This setting is variable for the purpose of allowing variations in the predetermined speed.

In the case of a speed-indicating device, the annular member 18 is suitably connected to indicating means, such as a scale and pointer or a graduated drum, to indicate according to a predetermined plan either the variations of speed changes or the rate of speed or both.

Under normal circumstances, a device of the type herein shown, when used as a governor, operates by varying the load, or in other words, the amount of power absorbed by the friction produced between the annular member 18 and the brake-shoes. For instance, should the torque applied to the shaft 11 increase appreciably, even though slightly with its tendency to increase the speed of rotation of the weight-members 12, the resulting increase in speed will momentarily increase the centrifugal force developed in the weight-members 12, with a tendency to further draw the collar 17 toward the collar 15. But, it must be remembered, the annular member 18 is in engagement with the brake-shoe and, with its connected collar 17, is held against such longitudinal movement. The result is that the bow-springs 13 are further deformed in a way which does not produce any shortening of the linear distances between their respective ends, for instance, in wave form as seen from the side. Therefore, the excess torque is absorbed by the deformation of the bow-springs and also by the increased friction between the disk and the brake-shoe. Now, if the torque is decreased slightly, the bow-springs tend to assume the shape they had before the speed was increased, that is, straight; with coincident change of position of the weight-member. It will thus be seen that, without producing any relative movement between the collar 17 carrying the annular member 18 and the collar 15, the weight-members 12 oscillate in their plane of rotation in the continuous effort of the governor to maintain its speed, and consequently the speed of its connected parts, constant. These oscillations have a certain frequency, depending upon the speed-variations.

These natural oscillations are inherent in the proper functioning of the governor and are usually so minute, in the ordinary variation of torque applied to the shaft 11, as to be practically unnoticeable.

In manufacturing governors of the type illustrated, it has been found, at times, that 50% are faulty in that they "square" or "hunt"; and this is true in spite of the utmost care taken in their manufacture. This "squaring" or "hunting" may be characterized as excessive vibration or oscillation of the governor parts, and is usually observable by a knocking noise produced in the rapid longitudinal oscillation of the annular member 18.

In the case of a governor, "squaring" renders the device inoperative as such, and upsets the predetermined plan of speed-control, in addition to the sometimes objectionable noise it produces. A peculiar phase of the "squaring" problem is that a tendency for a governor to "square" cannot be determined or detected by superficial inspection of the same. It only can be done after the governor is installed in the machine or mechanism in which it is intended to operate. Even then, some governors have been found to "square" when the parts have been brought to one speed, and not to "square" when the parts have been brought to another speed. Then, again a governor being tested, has been found to operate and function properly for a certain length of time, whereupon without any apparent cause, it would develop "squaring".

The porblem of "squaring" governors, therefore, has been a serious one. Not only was it necessary to scrap a large number of governors, but the labor lost in assembling, extensively testing, and then disassembling faulty governors was a serious factor in the manufacture of machines containing governors.

Extensive tests and experimentation by me have led me to believe that this "squaring" is produced by vibrations being impressed upon the naturally vibrating governor weight-members, which, as above stated, are vibrating or oscillating in their proper operation. I have found that impressed vibrations do not always cause "squaring" and this had led me to believe that "squaring" occurs only when the impressed vibrations have substantially the same ratio of frequency as the natural vibrations, causing the amplitude of the natural vibrations to be magnified, by resonance.

The excessive vibrations of the weight-members 12, in the case of a governor, cause the annular member 18 to oscillate to and from the position where it is engaged by the brake-shoe. This of course, upsets the natural functioning of the governor so that it is useless for its purpose.

I have found that the excessive vibrations of the weight-members 12 and connected parts can be prevented by applying friction or, in other words, a braking action opposing movement of the means supporting the springs at one end namely, the collar 17 and annular member 18, with relation to the means supporting the springs at their other ends namely, the collar 15. In the form herein illustrated, this friction is applied by means of a spring 19 secured at 20 to a collar 21, fixed upon the shaft 11 by means of a set-screw 22. The spring 19 is made to bear against a sleeve 23 carried by the collar 17. When this friction has been applied to the governor parts. such as by the spring 19 shown in Fig. 1, it is found that the governor will not "square" even when vibrations of extra ordinary amplitude are impressed upon the weight-members 12. In the manufacture of governors, in all respects like the one herein shown, except without my invention applied thereto, over 50% of the governors made were found to "square". With the same governor and my invention embodied therein, "squaring" has been eliminated; it ceases to be a problem.

The mode of operation of a governor embodying my invention, as I understand it is, that the friction produced by the springs 19 opposes any excessive oscillation of the collar 17 with the annular member 18 by absorbing the energy tending to produce the same.

It must be understood however, that any statement as to mode of operation or theory herein contained is merely by way of explanation, and that I am not to be confined to such statements. The fact is, that the application of this friction prevents "squaring", whatever mode of operation or upon whatever theory of operations it may depend.

In some cases, it is desirable to vary the amount of friction produced by the spring 19, for, if it is too excessive, the governor is rendered sluggish, and if it is not sufficient, it fails in its purpose. However, the adjustment is by no means critical. This adjustment may be accomplished by deforming the spring 19 to increase its pressure upon the sleeve 23 or it may be performed by a separate adjusting mechanism such as a screw 26, mounted in the collar 21 and engaging the spring 19.

In Fig. 4 there is shown a modification of the friction producing device shown in the other figures. In this form, a pair of springs are provided to engage each side of the sleeve 23. The operation of this form of device is substantially identical with that shown in the other form, the only difference being that the spring may be shorter than that shown in Figs. 1, 2 and 3.

In the drawings, the spring is mounted on the collar 21 in a slot adapted to receive it. The spring 19 is fastened in place in the slot in the collar 21 by pressing over the material at the tops of the walls of the slot. Any other suitable fastening arrangement may be provided.

The sleeve 23 connected to the collar 17 is extended toward the collar 21 so that the end 24 of the sleeve 23 will engage the wall 25 of the collar 21 to constitute a safety device by limiting the inward movement of the collar 17 and annular member 18 to prevent damage being done to the springs 13, should the brake-shoe fail to operate. The adjusted position of the collar 21 determines the maximum movement of the parts.

Having now described the invention, what is claimed as new and for which it is desired to obtain Letters Patent, is:

1. In combination, a speed-responsive device having a revoluble shaft; a member revolving with the shaft and slidable longitudinally thereon; centrifugally operated means; means carrying the latter and interconnecting the shaft and said slidable member for causing said member to slide on said shaft; and frictional means secured to the shaft and tending to brake the longitudinal sliding movement of said member.

2. A speed responsive device having a shaft; a slide thereon; weights; means carrying the latter and interconnecting the shaft and said slide for causing said slide to move on the shaft when the weights move outwardly due to centrifugal force; safety means engaged by the slide for limiting its sliding movement; and means carried by said safety means for frictionally engaging the slide to apply a braking action opposing its movement.

3. A speed responsive device having a shaft; a slide thereon; weights; means carrying the latter and interconnecting the shaft and said slide for causing said slide to move on the shaft when the weights move outwardly due to centrifugal force; a stop adapted to be engaged by the slide for positively limiting its sliding movement; and means carried by said stop for slidably engaging the slide in all its positions to yieldingly oppose its sliding movement.

4. A speed responsive device having a shaft; a part slidably mounted on the shaft; means interconnecting the shaft and the sliding part; weights carried by said means and adapted to cause relative movement between said shaft and said sliding part when the shaft rotates; a collar secured to the shaft to turn therewith and with relation to which the sliding part moves; and means secured to the collar and yieldingly engaging the sliding part to apply a braking action opposing its sliding movement.

5. A speed responsive device having a shaft; a part slidably mounted on the shaft; means interconnecting the shaft and the sliding part; weights carried by said means and adapted to cause relative movement between the shaft and said sliding part when the shaft rotates; a collar secured to the shaft to turn therewith and with relation to which the sliding part moves; and a leaf spring secured to the collar and yieldingly engaging the sliding part.

6. A speed responsive device having a shaft; a collar secured to the shaft; a sleeve movable on the shaft in the direction of the secured collar; weights; supporting members for the weights connected to the collar for rotation therewith and connected to the sleeve to slide the same on the shaft with relation to the collar when the weights move outwardly due to centrifugal force; a stop-collar secured to the shaft between said collar and sleeve; and means carried by the stop-collar to frictionally engage the sleeve to oppose its sliding movement.

7. In combination, a speed-responsive device having a revoluble shaft; a member revolving with the shaft and slidable longitudinally thereon; centrifugally operated means; means carrying the latter and interconnecting the shaft and said slidable member for causing said member to slide on said shaft; and frictional means between the shaft and slidable member to brake the longitudinal sliding movement of the member.

8. In combination, a speed-responsive device having a revoluble shaft; a member revolving with the shaft and slidable longitudinally thereon; centrifugally operated means; means carrying the latter and interconnecting the shaft and said slidable member for causing said member to slide on said shaft; and a leaf spring between said shaft and slidable member to brake the longitudinal sliding movement of said member.

Signed at Bridgeport, in the county of Fairfield, and State of Connecticut, this 12th day of April A. D. 1924.

ERWIN J. PANISH.